UNITED STATES PATENT OFFICE.

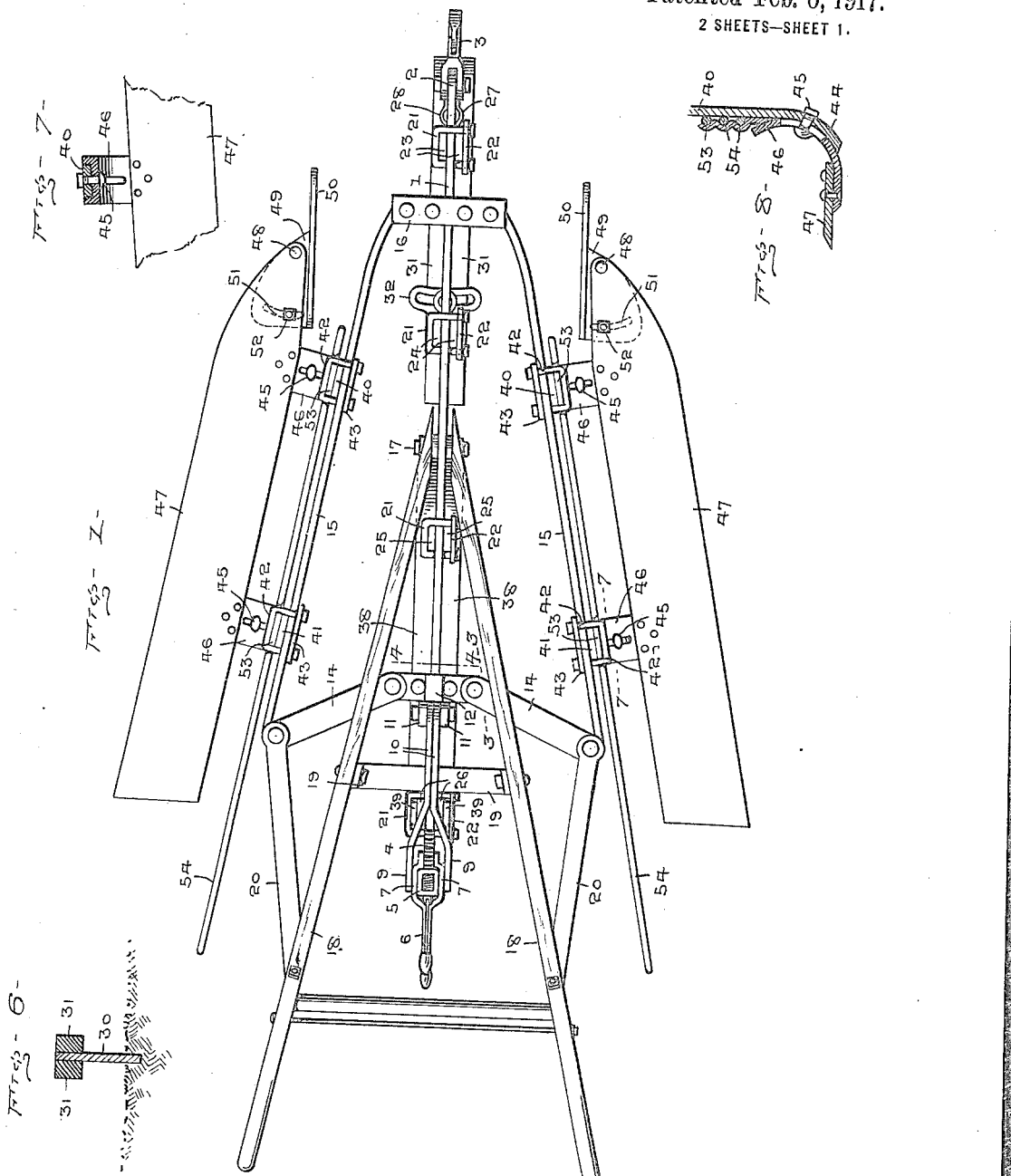

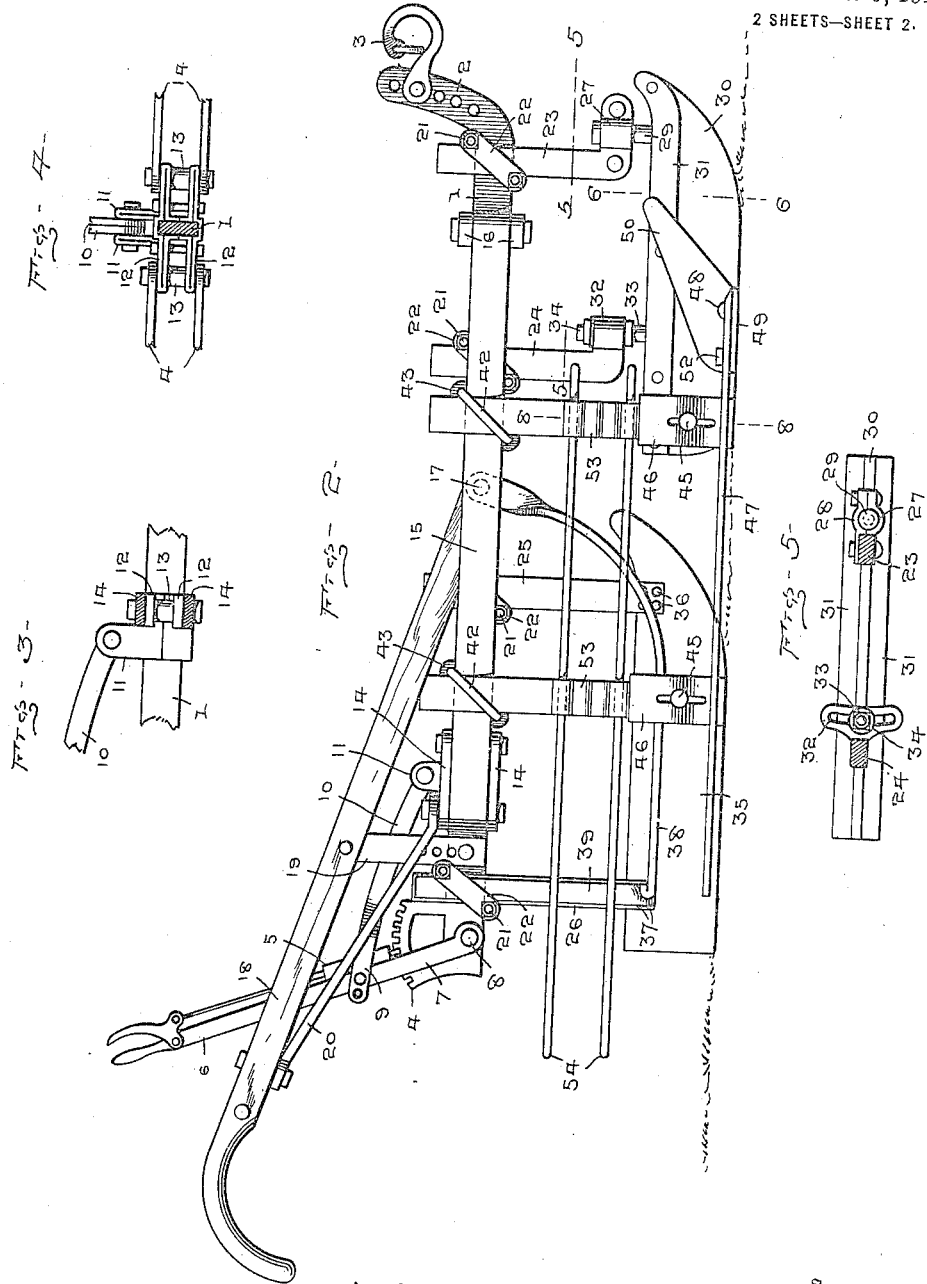

WILLIAM A. BIRDSELL, SR., OF RAVENNA, MICHIGAN.

HARVESTER.

1,214,990.   Specification of Letters Patent.   Patented Feb. 6, 1917.

Application filed June 13, 1916. Serial No. 103,444.

*To all whom it may concern:*

Be it known that I, WILLIAM A. BIRDSELL, Sr., a citizen of the United States, residing at Ravenna, in the county of Muskegon and State of Michigan, have invented certain new and useful Improvements in Harvesters; and I do hereby declare the following to be a full, clear, and exact description of the invention, such as will enable others skilled in the art to which it appertains to make and use the same.

This invention relates to harvesters, and more particularly to a device for harvesting beans and the like.

One of the objects is the provision of a device adapted to be driven between two rows of plants for severing the same at each side of the device at a point just above the ground and for delivering the cut plants in the middles of the next adjacent rows at each side of the device.

Another object is the provision of means for preventing the skidding or lateral movements of the device during the harvesting operation.

A further object is the provision of coöperating adjusting means for attaining the greatest range of lateral adjustments to adapt the device for efficient operation between rows of varying widths.

A further object is the provision of means for adjusting the delivering means to adapt the same for efficiently delivering plants of varying heights.

A further object is the provision of means for laterally adjusting the foremost of the non-skidding means for maintaining the device in the true line of draft of the device.

A further object is the provision of a device for harvesting beans and the like, which is simple in construction, efficient in operation, and which can be manufactured and sold upon the market at a nominal cost.

These and other objects and advantages will more fully appear as the nature of the invention is more clearly understood from the following specification, the subject matter of the claims, and the views illustrated in the accompanying drawings, in which, Figure 1 is a top plan view of the harvester.

Fig. 2 is a side view of the harvester.

Fig. 3 is a vertical sectional view on line 3—3 of Fig. 1, showing the detail construction of the adjustable sliding head employed.

Fig. 4 is a horizontal sectional view through the center bar of the frame, taken on line 4—4 of Fig. 1, showing a further detail construction of the sliding head thereon.

Fig. 5 is a horizontal sectional view, taken on line 5—5 of Fig. 2, showing the manner of adjustably mounting the foremost of the non-skidding devices upon the harvester.

Fig. 6 is a vertical sectional view, taken on line 6—6 of Fig. 2, showing the detail construction of the foremost non-skidding device employed.

Fig. 7 is a fragmentary top view of one of the cutting knives, with its supporting standard shown partly in section and taken on line 7—7 of Fig. 1, showing the manner of adjustably mounting the knives upon their supporting standards.

Fig. 8 is a vertical sectional view, taken on line 8—8 of Fig. 2, showing a further detail construction of the means for adjustably mounting the knives upon their supporting standards.

Referring to the drawings, wherein similar reference characters denote corresponding parts throughout the several views, the main frame of the device comprises the center bar 1, provided at its forward end with the upturned apertured attaching arm 2, upon which is adjustably mounted the clevis 3 to which is attached the swingle tree to adapt the device to be drawn over the ground by horse power, and upon the rear end of the center bar 1 is mounted the segmental rack 4, the teeth of which are engaged by the spring latch member 5 operatively mounted upon the operating lever 6 having its bifurcated end 7 embracing the segmental rack 4 and pivotally mounted upon the rear portion of the center bar 1 as at 8.

Adjustably and pivotally connected to the operating lever 6 at a point removed from its pivotal end are the spaced ends 9 of the connecting bars 10, having their forward ends pivotally mounted between the spaced ears 11 upon the two part head 12 slidably mounted upon the center bar 1, the respective ends of the two part sliding head 12 being retained in spaced relation to each other by the spacing blocks 13. Pivotally connected to the ends of the sliding head 12 are the inner ends of the rearwardly diverging links 14, the outer ends of the links 14 are pivotally connected to the rear ends of the swinging side bars 15 of the main frame, and which side bars have their forward ends pivotally mounted in the two part stationary head 16 which embraces and is rigidly secured upon the center bar 1 in proximity to its forward end.

Secured to the center bar 1 of the main frame, through the medium of the bolt 17 are the lower ends of the handles 18, adjustably supported centrally thereof upon the center bar 1 by the oppositely disposed brace bars 19, and pivotally and adjustably mounted upon the under surfaces of the handles 18 in proximity to their rear ends are the rear ends of the swinging supporting bars 20 having their forward ends pivotally connected to the rear ends of the swinging side bars 15 of the main frame.

Adjustably secured upon the center bar 1 by the plurality of U-bolts 21 and plates 22, and embracing the center bar 1 at each of its sides, are the divided upper ends of the front or first posts 23, the second post 24, the third post 25, and the rear or fourth post 26. The post 23 is positioned upon the bar 1 at a point forwardly of the head 16, and is provided at its lower end with the angular disposed journal bracket 27 provided with the complemental journal plate 28 suitably bolted in operative position upon the post 23 and the outer end of the journal bracket 27, and revolubly mounted within the journal bracket 27 and plate 28 is the headed pivot bolt 29 secured to the upper forward portion of the front anti-slipping blade or runner 30, having its upper edge reinforced by the reinforcing ribs or flanges 31 at each side thereof, the reinforcing ribs or flanges also perform the function of guard ribs or flanges for preventing the blade or runner 30 from penetrating the ground to a too great depth. The post 24 is positioned upon the center bar 1 at a suitable point rearwardly of the head 16, and at its lower end is provided the transversely elongated slotted bracket 32, in which is adjustably and slidably mounted the sliding bolt 33 secured upon the upper edge of the blade or runner 30 in proximity to its rear end, the sliding bolt 33 being secured in its respective adjusted positions within the bracket 32 of the post 24 by the nut 34 screw threaded upon the upper projecting end of the sliding bolt 33, whereby the front anti-slipping blade or runner 30 may be adjusted laterally for maintaining the harvester along the true line of draft in accordance with the degree of inclination of the hill side or other surfaces upon which the harvester is being operated in angular relation to the inclination. The post 25 is positioned upon the center bar 1 at a suitable point rearwardly of the bolt 17 which secures the lower ends of the handles 18 to the bar 1 and has its lower end bifurcated for embracing the upper forward edge portion of the rear anti-slipping blade or runner 35 and secured thereto through the medium of the rivets 36 or other suitable securing means. The rear post 26 is positioned upon the center bar 1 at a point adjacent the segmental rack 4 and has its lower end also bifurcated for embracing the upper rear edge portion of the rear anti-slipping blade or runner 35 and is secured thereto by the rivets 37 or other suitable securing means. At each side of the rear blade or runner 35 are the flat guard bars 38 having their forward end portions curved upwardly with their ends wrung or twisted at substantially right angles to the plane of the body portions and pivotally mounted upon the handle securing bolt 17 between the ends of the handles and the sides of the center bar 1, the guard bars 38 also have their rear end portions wrung or twisted substantially at right angles to the plane of the horizontal body portions and disposed upwardly therefrom to provide the stems 39 which rest against the outer faces of the rear post 26 and adjustably mounted upon the center bar 1 through the medium of the rearmost U-bolt 21 and plate 22 which U-bolt and plate retain the post 26 and the stems 39 upon the center bar 1. The guard bars 38 are adapted to be adjusted for regulating the depth to which the rear blade or runner 35 is to enter the ground.

Upon each of the swinging side bars 15 of the frame are the front posts 40 and the rear posts 41 suitably spaced apart and adjustably secured upon the bars 15 through the medium of the U-bolts 42 and the plates 43. The lower ends of the posts are apertured and outwardly curved as at 44 in Fig. 8 to which are adjustably secured through the medium of the bolts 45 the slotted curved attaching arms 46, formed substantially U-shaped in cross section for embracing the curved ends 44 to prevent lateral movement thereon and upon the outer ends of which are suitably secured the elongated flat cutting blades 47. The forward ends of the cutting blades 47 are pointed and have pivotally mounted thereon at 48 the base plates 49 of the upstanding guard plates 50, the base plates 49 adjacent their rear ends are provided with the transverse slots 51 through which and the cutting blades or knives 47 projects the bolts 52 to provide for the swinging adjustments of the guard plates 50 in accordance with the adjustments of the widths of the device, the guard plates 50 being provided to cause the cutting blades or knives 47 to ride over sods, weeds or other obstructions which may be upon the surface of the land and thereby preventing the same from collecting on top of the blades or cutting knives 47.

Positioned upon the outer faces of the front posts 40 and the rear posts 41 are the corrugated plates 53 held in snug engagement with the posts 40 and 41 but adjustable thereon by the U-bolts 42, and interposed between the posts 40 and 41 and the corrugated plates 53 are a plurality of horizontally disposed rods or fingers 54 having their ends projecting for a distance rearwardly of the rear ends of the blades or cutting knives 47, any number of the rods 54 may be employed and adjusted to any desired heights in accordance with the height of the plants to be cut and are provided for delivering the cut plants to the middles between the rows at both sides of the device during the cutting operation.

The operation of the device is briefly described as follows:—

The harvester has no wheels and is adapted to be dragged along the ground by horse or other power between two rows of plants, the cutting knives of the harvester being suitably adjusted so that they will cut the plants at a point slightly above the ground and as the knives and the delivering rods converge forwardly the cut plants will ride along the upper surfaces of the cutting knives and engage the delivering rods and slide therealong toward their rear ends whereby the cut plants will be projected into the next adjacent middles at each side of the harvester, so that upon the next trip between the two succeeding rows the cut plants of the right hand row will be delivered upon the cut plants of the preceding right hand row and thereby place two rows in one and thus greatly facilitate the subsequent handling and harvesting of the plants. The harvester can be adjusted to cut plants at any desired heights by vertically adjusting the cutting knives and delivering rods upon the swinging bars of the frame, and also by adjusting the height of the guard bars of the rear blade or runner; and by the employment of the operating lever and its connections with the swinging bars of the frame the width of the device may be regulated to correspond with the distance between the plant rows.

By the employment of the front and rear blades or runners upon the center bar of the frame, which are adapted to penetrate the ground, it is impossible for the harvester to slide laterally or skid to one side when operating upon hill sides and other inclined surfaces thereby maintaining the harvester directly in the middles between the rows so that the cutting knives at each side of the harvester will always be held in cutting operation with respect to the plants.

By the employment of the curved arms for adjustably securing the cutting knives upon the curved ends of the posts upon the swinging bars of the frame, the cutting knives may be revolved transversely of their longitudinal axes to change the angular degree of cutting of the knives when desired.

Having described my invention, what I claim as new and desire to secure by Letters Patent, is:—

1. A device for harvesting beans and the like, comprising a main frame, means for adjusting the width of the main frame at will, vertically adjustable supporting means upon the sides of the main frame, and a knife adjustably mounted upon each side of the main frame upon the said supporting means.

2. A device for harvesting beans and the like, comprising a main frame, means for adjusting the width of the main frame at will, vertically adjustable standards upon the sides of said main frame, and a knife arranged on each side of the main frame and supported on said standards, each knife having pivotal adjustment on an axis parallel to the ground.

3. A device for harvesting beans and the like, comprising a main frame, means for adjusting the width of the main frame at will, a cutting knife carried by each side of the said frame, and an upwardly inclined guard adjustably attached to the forward end of each knife blade.

4. A device for harvesting beans and the like, comprising a main frame, means for adjusting the width of the main frame at will, a cutting knife carried by each side of said frame, and a guard pivotally mounted on the forward end of each blade and adjustable in a plane parallel to the blade.

5. A device for harvesting beans and the like, comprising a main frame provided with a center bar and laterally swingingly adjustable side bars, means for actuating said side bars for varying the width of said main frame, means adjustably mounted upon said center bar adapted to penetrate into the ground for preventing the lateral displacement of the device during the harvesting operations, means for regulating the depth of said penetrating means, means for laterally adjusting certain of said penetrating means for maintaining the device in the true line of draft when desired, and severing and delivering members carried by said side bars.

6. A device for harvesting beans and the like, comprising a main frame having a center bar and laterally swingingly adjustable side bars pivotally mounted thereon, means for actuating said side bars to vary the width of said frame, adjustable runners mounted upon said center bar to prevent the lateral displacement of said device, cutting knives adjustably mounted upon said side bars, and means for pivotally adjusting each cutting knife on an axis parallel to the ground.

7. A device for harvesting beans and the like, comprising a main frame having a center bar and laterally swingingly adjustable side bars pivotally mounted thereon, means for actuating said side bars to vary the width of said frame, means to prevent the lateral displacement of said device, cutting knives vertically adjustable upon said side bars, means to vary the cutting angle of each blade with respect to the ground, and a plurality of delivery rods carried by said side bars in coöperative relation to said cutting knives for delivering the cut plants at either side of the device.

8. A device for harvesting beans and the like, comprising a main frame, consisting of a center bar, swingingly adjustable side bars, runners vertically adjustable on the center bar, means for adjusting one of said runners rotationally to maintain the device in the true line of draft, and a cutting knife carried by each side of the main frame.

9. A device for harvesting beans and the like, comprising a main frame, consisting of a center bar, laterally swingingly adjustable side bars, vertically adjustable runners connected to the center bar, a guard flange for one of said runners to limit the running depth of the runners in the ground, and a cutting knife carried by each side of the main frame.

10. A device for harvesting beans and the like, comprising a main frame, consisting of a center bar, laterally swingingly adjustable side bars, vertically adjustable runners attached to the said center bar, a guard for one of said runners pivotally mounted at its forward end to the center bar, means for adjusting the rear end of the guard vertically with respect to the runner and the center bar, whereby the running depth of the runners may be regulated, and a cutting knife carried by each side of the main frame.

In testimony whereof I have signed my name to this specification in the presence of two subscribing witnesses.

WILLIAM A. BIRDSELL, Sr.

Witnesses:
  JOHN VANDERWERP,
  TODD HUNSFORD.

Copies of this patent may be obtained for five cents each, by addressing the "Commissioner of Patents, Washington, D. C."